United States Patent
Fujisawa

(10) Patent No.: US 8,065,486 B2
(45) Date of Patent: Nov. 22, 2011

(54) CACHE MEMORY CONTROL CIRCUIT AND PROCESSOR

(75) Inventor: Toshio Fujisawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 355 days.

(21) Appl. No.: 12/400,308

(22) Filed: Mar. 9, 2009

(65) Prior Publication Data

US 2009/0235057 A1   Sep. 17, 2009

(30) Foreign Application Priority Data

Mar. 11, 2008   (JP) .................................. 2008-061487

(51) Int. Cl.
   *G06F 12/00*   (2006.01)
(52) U.S. Cl. .................................. 711/128; 711/E12.052
(58) Field of Classification Search .................... 711/128
   See application file for complete search history.

(56) References Cited

U.S. PATENT DOCUMENTS

| 5,802,594 A * | 9/1998 | Wong et al. ................... 711/167 |
| 6,185,657 B1 * | 2/2001 | Moyer ........................... 711/128 |
| 2006/0090034 A1 * | 4/2006 | Ishihara et al. ............... 711/118 |

FOREIGN PATENT DOCUMENTS

| JP | 8-263370 | 10/1996 |
| JP | 2002-236616 | 8/2002 |

OTHER PUBLICATIONS

U.S. Appl. No. 12/399,463, filed Mar. 6, 2009, Toshio Fujisawa.

* cited by examiner

*Primary Examiner* — Reginald Bragdon
*Assistant Examiner* — Hamdy Ahmed
(74) *Attorney, Agent, or Firm* — Oblon, Spivak, McClelland, Maier & Neustadt, L.L.P.

(57) ABSTRACT

A cache memory control circuit includes a selecting section configured to be capable of selecting, in a predetermined order, each way or a predetermined two or more ways of a cache memory having multiple ways; a comparing section configured to detect a cache hit in each way; and a control section configured to, upon detection of a cache hit, stop a selection of the respective ways or the predetermined two or more ways at the selecting section.

17 Claims, 7 Drawing Sheets

FIG.4

| OPERATING FREQUENCY | NUMBER OF DIVISIONS | PRIORITY |
|---|---|---|
| 100 | 4 | 1 |
|  | 2 | 2 |
|  | 1 | 3 |
| 200 | 2 | 1 |
|  | 1 | 2 |
| 400 | 1 | 1 |

DT, A1, A2, A3

FIG.5A CLK (400 MHz)

FIG.5B CPU CORE FREQUENCY (100 MHz)

FIG.5C CE

FIG.5D WAY ENABLE [3:0]    0    1    0

FIG.5E CACHE HIT [3:0]    0    1    0

FIG.5F DATA TO CPU    INVALID    VALID

FIG.7
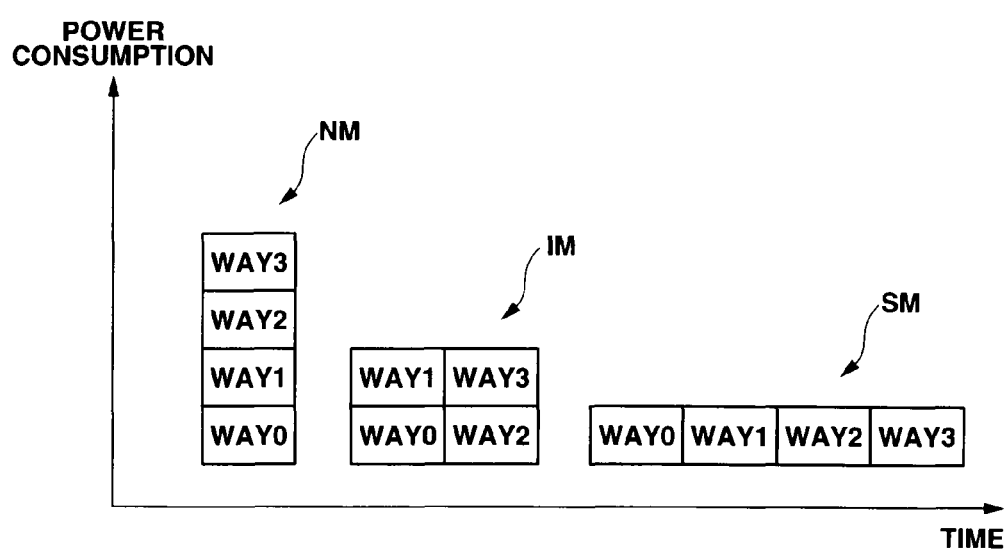

FIG.10
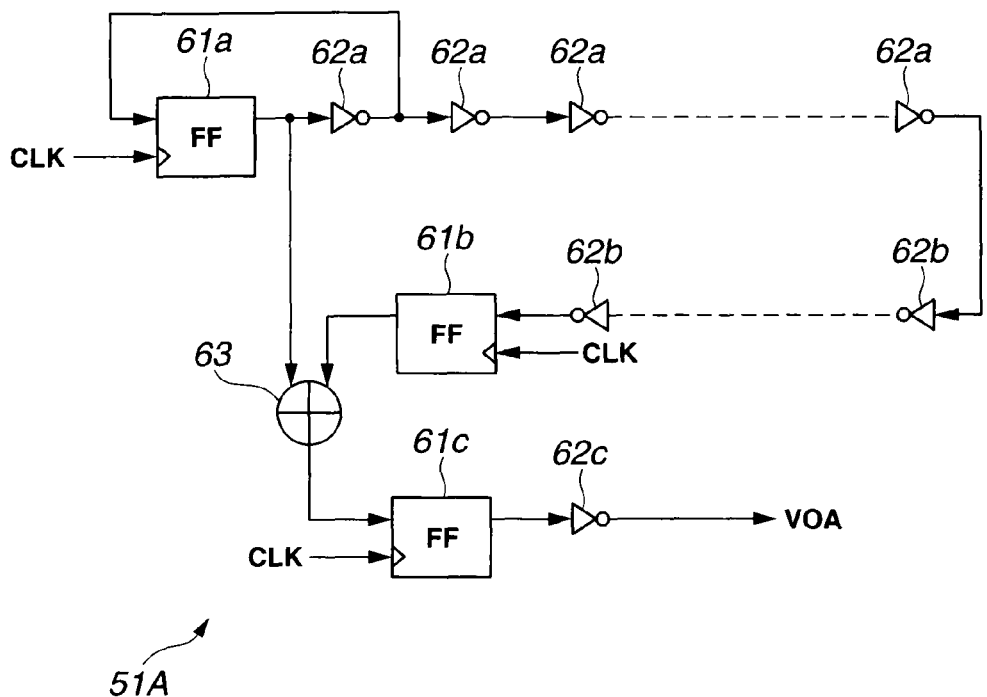
FIG.11A CLK (400 MHz)
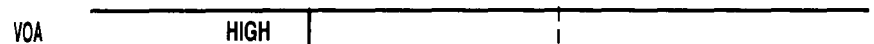
FIG.11B VOA — HIGH
FIG.11C CE
| FIG.11D | WAY ENABLE [3:0] | 0 | 3 | C | 0 |
|---|---|---|---|---|---|
| FIG.11E | CACHE HIT [3:0] | 0 | 4 | 0 |
|---|---|---|---|---|
| FIG.11F | DATA TO CPU | INVALID | VALID |
|---|---|---|---|

CACHE MEMORY CONTROL CIRCUIT AND PROCESSOR

CROSS REFERENCE TO RELATED APPLICATIONS

This application is based upon and claims the benefit of priority from the prior Japanese Patent Application No. 2008-61487 filed in Japan on Mar. 11, 2008; the entire contents of which are incorporated herein by reference.

BACKGROUND OF THE INVENTION

1. Field of the Invention

The present invention relates to a cache memory control circuit and a processor, and more particularly to a cache memory control circuit of a cache memory having a plurality of ways, and a processor.

2. Description of the Related Art

Cache memories are widely used in processors in order to access data stored in a main memory at high speed. The cache memory is provided between the central processing unit (hereunder, referred to as "CPU") and the main memory.

Some cache memories have a plurality of ways that have the same entry address. In those kinds of cache memories, an address decoder simultaneously performs a frame address comparison, i.e. a tag comparison, with respect to all the ways based on entry addresses in address data from the CPU, and outputs words that are shown by word addresses to the CPU from among the data that is read from the cache memory.

Recently, in order to reduce the power consumption of processors, cache memories that have two access modes have been proposed (for example, see Japanese Patent Application Laid-Open Publication No. 2002-236616). According to the cache memory proposed in Japanese Patent Application Laid-Open Publication No. 2002-236616, a tag comparison is performed for all ways in a normal access mode, while in a unique access mode a tag comparison is performed only for a selected way. Thus, in the unique access mode, the power consumption is decreased because only the minimum required memory region operates.

However, in the unique access mode described in the above proposal, a cache memory region to be used is limited, and hence even when the same software is operated, there are cases in which the frequency of cache misses increases in comparison to the normal access mode. In such a case, many cache refill operations occur and thus lower power consumption is not adequately performed.

The present invention was made in consideration of the above described problem, and an object of the invention is to provide a cache memory control circuit and a processor that can cause a cache memory to operate in an access mode that operates with the lowest possible power consumption while maintaining a cache hit performance that is equivalent to that of a normal access mode.

BRIEF SUMMARY OF THE INVENTION

According to one aspect of the present invention there can be provided a cache memory control circuit having: a selecting section configured to be capable of selecting, in a predetermined order, each way or a predetermined two or more ways of a cache memory having a plurality of ways; a cache hit detecting section configured to detect a cache hit in the respective ways; and a control section configured to, upon detection of the cache hit, stop a selection of the respective ways or the predetermined two or more ways at the selecting section.

BRIEF DESCRIPTION OF THE DRAWINGS

FIG. 4 is a view that illustrates an example of a divisions table according to the first embodiment of the present invention;

FIG. 5A to FIG. 5F are timing charts for describing the operations of a processor according to the first embodiment of the present invention, in which FIG. 5A is a waveform diagram of a clock signal, FIG. 5B is a waveform diagram of a frequency signal of a CPU core, FIG. 5C is a waveform diagram of a chip enable signal, FIG. 5D is a waveform diagram of a way enable signal, FIG. 5E is a waveform diagram of a cache hit signal, and FIG. 5F is a waveform diagram of data sent to the CPU;

FIG. 6A to FIG. 6F are timing charts for a case in which there is a cache hit in a way #3 according to the first embodiment of the present invention, in which FIG. 6A is a waveform diagram of a clock signal, FIG. 6B is a waveform diagram of a frequency signal of a CPU core, FIG. 6C is a waveform diagram of a chip enable signal, FIG. 6D is a waveform diagram of a way enable signal, FIG. 6E is a waveform diagram of a cache hit signal, and FIG. 6F is a waveform diagram of data sent to the CPU;

FIG. 7 is a view for conceptually explaining power consumption states in three access modes consisting of a normal access mode, a sequential access mode, and an intermediate mode according to the first embodiment of the present invention;

FIG. 10 is a block diagram that shows an example of the configuration of a timing violation detection circuit according to the second embodiment of the present invention; and FIG. 11A to FIG. 11F are timing charts for describing the operations of a processor in a case in which a number of divisions is two according to the second embodiment of the present invention, in which FIG. 11A is a waveform diagram of a clock signal, FIG. 11B is a waveform diagram of an output signal of a timing violation detection circuit, FIG. 11C is a waveform diagram of a chip enable signal, FIG. 11D is a waveform diagram of a way enable signal, FIG. 11E is a waveform diagram of a cache hit signal, and FIG. 11F is a waveform diagram of data sent to the CPU.

DETAILED DESCRIPTION OF THE EMBODIMENTS OF THE INVENTION

Hereunder, embodiments of the present invention are described with reference to the attached drawings.

First Embodiment (Configuration)

Figure 1:
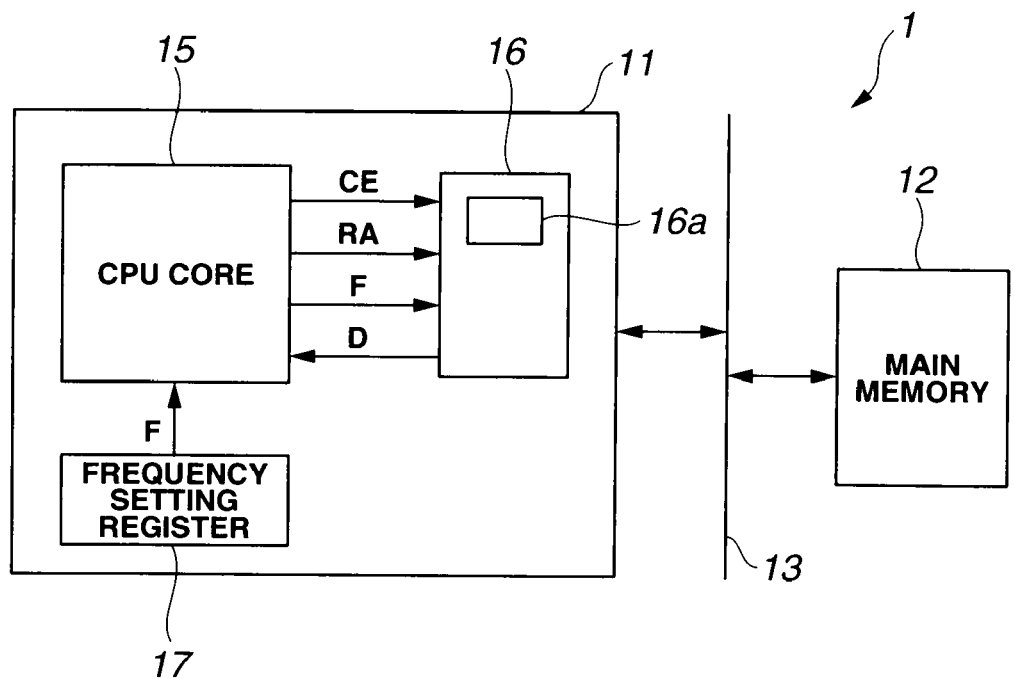
FIG. 1 is a configuration diagram showing the configuration of a processor according to a first embodiment of the present invention.

First, the configuration of a processor that includes a cache memory according to the present embodiment will be described based on FIG. 1. FIG. 1 is a configuration diagram that shows the configuration of a processor according to the present embodiment.

In FIG. 1, a processor 1 includes a CPU 11, a main memory 12, and a system bus 13. The CPU 11 includes a CPU core 15, a cache memory 16, and a frequency setting register 17.

The CPU 11 reads out and executes commands or data stored in the main memory 12 via the system bus 13 and the cache memory 16 including a cache memory control circuit. The CPU core 15 reads out commands or data (hereunder, referred to simply as "data") required for execution of a program from the cache memory 16 and executes the program. The CPU core 15 outputs real address data RA of the main memory 12 to the cache memory 16. If data for the real address data RA that has been input exists in the cache memory 16, the cache memory 16 outputs such data D to the CPU core 15. If there is no data stored in the cache memory 16, the data is read out from the main memory 12 by refill processing and written in the cache memory 16, and output to the CPU core 15.

In this connection, in order to simplify the description, an example is described here that does not have a memory management unit (MMU). In a case in which the configuration includes a memory management unit (MMU), the CPU core 15 outputs a virtual address and not a real address.

Further, as a signal to activate the cache memory 16, the CPU core 15 outputs a chip enable signal CE to the cache memory 16. Accordingly, the CPU core 15 outputs the chip enable signal CE when using the cache memory 16.

A value for the operating frequency of the CPU 11 is set in the frequency setting register 17 as an operating frequency setting section. Setting of the operating frequency of the CPU 11 is performed, for example, by a user specifying the operating frequency from outside. Operating frequency data F that is set in the frequency setting register 17 is input to the CPU core 15. The CPU core 15 outputs the operating frequency data F to the cache memory 16. According to the present embodiment, the CPU core 15 is configured so that any value among the values 100 MHz, 200 MHz, and 400 MHz can be set.

Further, the operating frequency of the cache memory 16 operates at an operating frequency that is greater than or equal to the operating frequency F of the CPU core 15. In this case, it is assumed that the operating frequency of the cache memory 16 is 400 MHz.

The CPU core 15, for example, outputs real address data RA that is 32 bits wide to the cache memory 16, and the cache memory 16 outputs 32-bit word data D to the CPU core 15.

Further, the cache memory 16 includes a cache access controller 16a as a control circuit, in addition to a small capacity memory (not shown) that stores data. The configuration of the cache access controller 16a will be described later.

Figure 2:
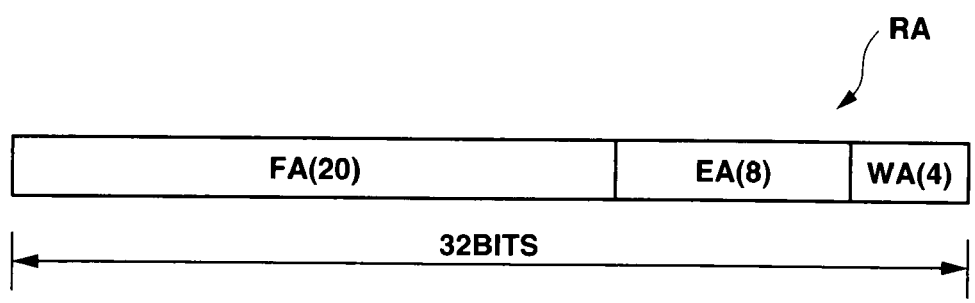
FIG. 2 is a view that shows a configuration example of real address data according to the first embodiment of the present invention.

FIG. 2 is a view that shows a configuration example of real address data that is output from the CPU core 15. In this case, the real address data RA is 32-bit data that consists of a frame address FA of 20 bits on the higher-order bit side, an 8-bit entry address EA, and a 4-bit word address WA on the lower-order bit side.

Figure 3:
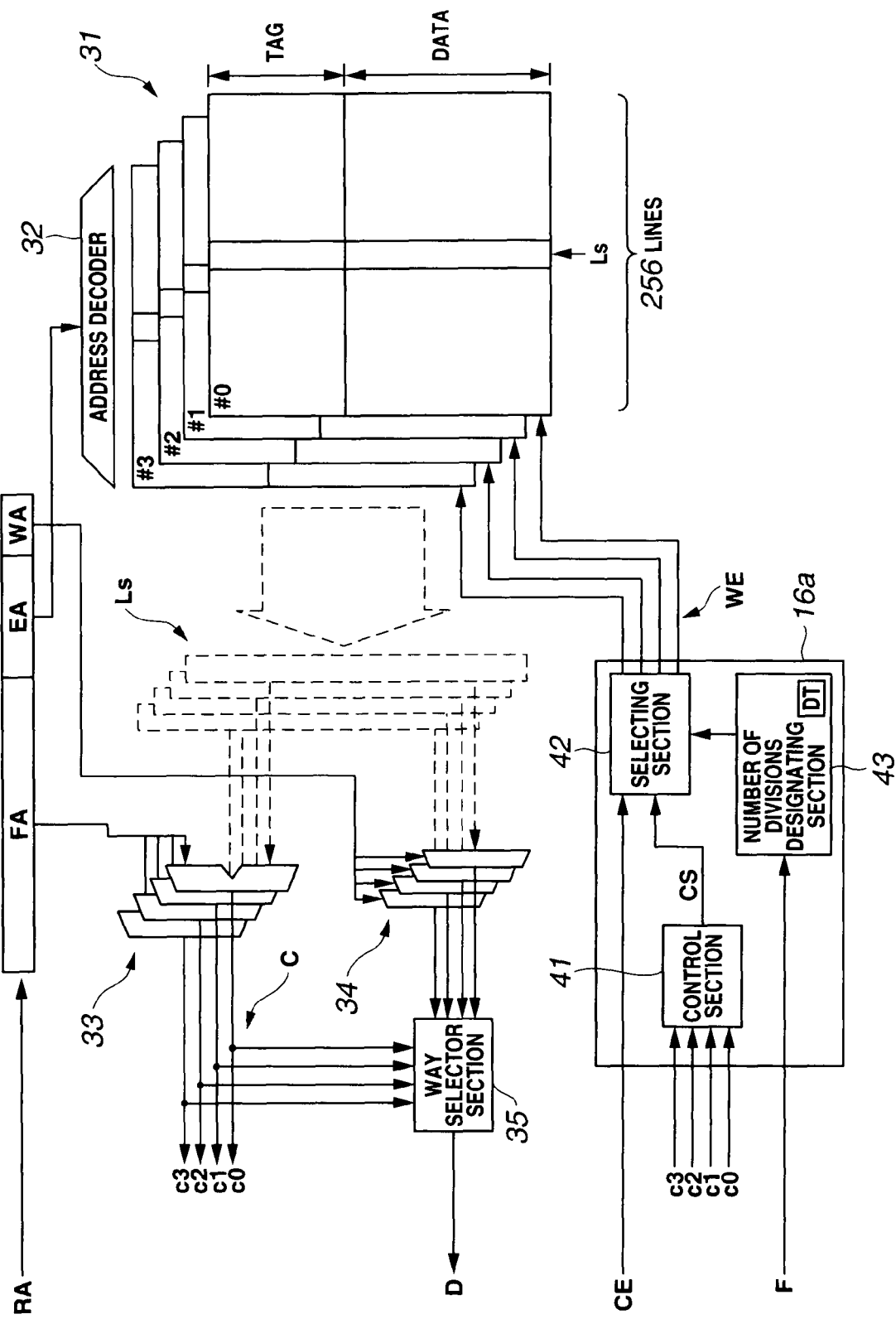
FIG. 3 is a view for explaining a configuration example of a cache memory according to the first embodiment of the present invention.

FIG. 3 is a view for describing a configuration example of the cache memory 16.

The cache memory 16 has a small-capacity storage section 31 that stores data. The cache memory 16 also has a cache memory control circuit that includes an address decoder 32, a comparing section 33, a word selector section 34, a way selector section 35, and a cache access controller 16a. The cache access controller 16a includes a control section 41, a selecting section 42, and a number of divisions designating section 43. The small-capacity storage section 31 is a memory consisting of N (N is an integer of 2 or more) ways, in this case four ways, and the cache memory 16 is a four-way set associative cache memory. The comparing section 33 and the word selector section 34 respectively correspond to lines Ls (in this case, four lines) that are selected in each way, and have a plurality of comparators (in this case, four comparators) and a plurality of word selectors (in this case, four word selectors).

In this case, each way has 256 blocks, i.e. 256 lines, and each line is designated by an 8-bit entry address EA.

Each line has a data portion that includes 16 items of word data, and a tag portion that includes frame address data. Which item of word data to read out from among the 16 word data items is specified by a 4-bit word address WA among the input real address RA.

The real address data RA, chip enable signal CE, and operating frequency data F are input into the cache memory 16, and the cache memory 16 outputs the data D to the CPU core 15.

The control section 41 of the cache access controller 16a is a circuit which inputs match signals c0 to c3 that are comparison result signals from the comparing section 33 that will be described later. The match signals c0 to c3 are signals that indicate cache hits. The selecting section 42 is a circuit which inputs a control signal CS from the control section 41 and a chip enable signal CE. The selecting section 42 outputs a way enable signal WE to each way. As described later, the selecting section 42 selects the respective ways so as to enable all four ways at the same time, or to enable each way in a predetermined order so that the ways do not overlap in time, or, furthermore, to enable a plurality of (in this case, two) ways in a predetermined order so that the ways do not overlap in time. The way enable signal WE to each way is a signal that enables the respective ways, that is, a signal that activates the relevant way.

The number of divisions designating section 43 is a circuit into which the operating frequency data F is input. The number of divisions designating section 43 outputs number of divisions data corresponding to the input operating frequency data F to the selecting section 42.

The operating frequency F of the CPU core 15 is variable and, as described above, the CPU core 15 can operate at 400 MHz, 200 MHz, or 100 MHz. The operating frequency F can be set by the user as described above. Data for the specified operating frequency is input to the number of divisions designating section 43.

The entry address EA of the real address data RA that is input to the cache memory 16 is supplied to the address decoder 32. The address decoder 32 selects a line corresponding to the entry address EA from each of the four ways #0 to #3 of the small-capacity storage section 31. Since the entry address EA has 8 bits, one line is selected without fail for each way.

The word address WA of the real address data RA is supplied to the word selector section 34. The four word selectors of the word selector section 34 respectively select word data corresponding to the word address WA from each of the selected four lines Ls of the small-capacity storage section 31. Since the word address WA has 4 bits, one piece of word data is selected without fail for each line Ls. The word data selected by each word selector is output to the way selector section 35.

Further, the frame address FA of the real address data RA is supplied to one input of each of the four comparators of the comparing section 33. Four pieces of frame address data of the four tag portions of the selected four lines Ls are input to the four comparators of the comparing section 33, respectively. The four comparators of the comparing section 33 respectively compare the input frame address FA and the frame address data of the tag portions that has been input, and output a comparison result signal C. When there is frame address data of a tag portion that matches the input frame address FA, the comparing section 33 outputs one of the match signals c0 to c3 to indicate that a cache hit is detected. The comparing section 33 constitutes a cache hit detecting section that detects a cache hit in the respective ways.

The match signals c0 to c3 that indicate detection of a cache hit correspond to four ways #0 to #3, respectively, and are signals that indicate that a frame address FA and frame address data of a tag portion match.

Accordingly, none of the match signals c0 to c3 is output unless the frame address FA that is input and frame address data of a tag portion that is input match. If there is a match between the input frame address RA and input frame address data of the tag portions, a single match signal that corresponds to a single way with respect to which the frame address FA matches the frame address data of a tag portion is output.

The match signals c0 to c3 are input to the way selector section 35. The way selector section 35 is a circuit that outputs word data (D) of a line of a way corresponding to a match signal among the word data that is input from the word selector section 34.

Upon input of the chip enable signal CE, the selecting section 42 selects, in a predetermined order, one way at a time or two ways at a time, and outputs a way enable signal WE to enable a selected way. In this connection, in some cases, upon input of the chip enable signal CE, the selecting section 42 selects all ways simultaneously and outputs a way enable signal WE to enable each way.

Upon input of a match signal, the control section 41 outputs the control signal CS to the selecting section 42 to stop output of the way enable signal WE. Accordingly, the control signal CS is a stop instruction signal that stops a selection of a way by the selecting section 42 during the process of selection upon detection of a cache hit.

The number of divisions designating section 43 includes a divisions table DT as shown in FIG. 4. The number of divisions designating section 43 refers to the divisions table DT and outputs number of divisions data that corresponds to the input operating frequency data F.

FIG. 4 is a view that shows an example of the divisions table DT. As shown in FIG. 4, the divisions table DT is a table in which one or more number of divisions has been set and stored for each operating frequency. In this case, the operating frequencies are 400 MHz, 200 MHz, and 100 MHz. Further, in the divisions table DT, number of divisions data is set for each operating frequency together with priority data.

As shown in FIG. 4, when the operating frequency F of the CPU core 15 is 100 MHz, three division numbers, 4, 2, and 1, are set in correspondence to three priorities 1, 2, and 3. Further, when the operating frequency F of the CPU core 15 is 200 MHz, two division numbers, 2 and 1, are set in correspondence to two priorities, 1 and 2. Furthermore, when the operating frequency F of the CPU core 15 is 400 MHz, a single division number, 1, is set in correspondence to a single priority, 1.

According to the present embodiment, when the operating frequency F of the CPU core 15 is specified, the number of divisions designating section 43 normally selects data for the number of divisions corresponding to the highest priority, which in this case is "1", and outputs the data to the selecting section 42. For example, when the operating frequency F of the CPU core 15 is 100 MHz, the number of divisions designating section 43 outputs number of divisions data that indicates four divisions corresponding to the highest priority "1" to the selecting section 42.

In this connection, a configuration may also be adopted that allows the user to select the number of divisions. More specifically, a configuration may be adopted in which a user can specify and select a number of divisions corresponding to a priority other than the highest priority for the operating frequency F of the CPU core 15. For example, the user may set the number of divisions designating section 43 so as to output number of divisions data that indicates the number of divisions "2" that corresponds to priority "2" to the selecting section 42, in a case in which the operating frequency F of the CPU core 15 is 100 MHz.

As described above, the divisions designating section 43 outputs data designating the number of divisions that correspond to the operating frequency F of the CPU core 15 to the selecting section 42.

The selecting section 42 divides one CPU cycle with the designated number of divisions, and outputs way enable signals WE that select respective ways or a plurality of ways to the respective ways within the divided periods.

(Operation)

Next, the operations of the cache memory 16 of the above described processor 1 are described.

FIG. 5A to FIG. 5F are timing charts for explaining the operations of the processor 1. The cache memory 16 operates at 400 MHz as described above. Hereunder, a case is described in which the operating frequency F of the CPU core 15 is set at 100 MHz.

When the user sets the operating frequency F of the CPU core 15 to 100 MHz, the set operating frequency data F is stored in the frequency setting register 17 and output to the number of divisions designating section 43 via the CPU core 15. The number of divisions designating section 43 refers to the divisions table DT, and outputs number of divisions data corresponding to the highest priority to the selecting section 42. The selecting section 42 outputs way enable signals WE to each way so as to divide one CPU cycle according to the input number of divisions.

Accordingly, when the operating frequency F of the CPU core 15 is set to 100 MHz, each way is selected by using four divisions that correspond to the highest priority 1.

Further, when the operating frequency F of the CPU core 15 is set to 200 MHz, each way is selected by using two divisions that correspond to the highest priority 1. Furthermore, when the operating frequency F of the CPU core 15 is set to 400 MHz, each way is selected by using one division (that is, no dividing occurs) that corresponds to the highest priority 1, i.e. all the ways are selected simultaneously.

Thus, since one CPU cycle is divided according to the operating frequency of the CPU core 15 that is connected to the cache memory 16, the number of ways that are selected changes according to each selection by the selecting section 42.

This operation will now be described specifically using FIG. 5A to FIG. 5F. First, when the operating frequency F of the CPU core 15 is set to 100 MHz, a system clock CLK of the processor 1 is 400 MHz and the CPU core 15 operates at 100 MHz. Since the cache memory 16 is operating at 400 MHz, a frequency ratio between the CPU core 15 and the cache memory 16 is 1:4.

Since operating frequency data F of 100 MHz is input to the number of divisions designating section 43, the number of divisions designating section 43 refers to the divisions table DT and outputs number of divisions data indicating four divisions that corresponds to the highest priority "1" to the selecting section 42.

As a result, upon receiving the chip enable signal CE, the selecting section 42 starts operations so as to output way enable signals WE[0], WE[1], WE[2], WE[3] one by one in that order. More specifically, during one CPU cycle, the cache memory 16 executes a comparison between the frame address FA of the real address data RA that is input and a frame address of the tag portion of each way in sequential order. In this case, the comparison is performed in order from way #0 to #3.

First, the cache memory 16 sets the way enable signal WE[0] corresponding to way #0 to "high", and compares whether the frame address of the tag portion that is read out from way #0 matches the input frame address FA. If the two frame addresses match, the match signal c0 for the comparison result signal C becomes "high" to indicate a cache hit.

According to FIG. 5D, as a way enable signal WE for ways #0 to #3, "1" that indicates "0001" is output. Subsequently, "1" that indicates "0001" is output for four match signals c0 to c3 as comparison result signals C. In "0001" of the comparison result signal C, a cache hit [0] signal is indicated by "1".

According to the example shown in FIG. 5A to FIG. 5F, when the frame address of a tag portion that has been stored in the way #0 is compared with the input frame address FA, the frame addresses are found to match, i.e. there is a hit, and therefore, after that match, the data to the CPU core 15 becomes valid. Therefore, by taking in the output of the way selector 35 at the timing of a rise in the next CPU cycle, the CPU core 15 obtains data that has been cached in the way #0.

Further, since the comparison result signal C is being input to the control section 41, the control section 41 can detect a cache hit. Upon detecting a cache hit, the control section 41 outputs a control signal CS that stops output of the way enable signal WE to the selecting section 42. Upon receiving the control signal CS, the selecting section 42 stops any subsequent output of the way enable signal WE. Hence, since the selecting section 42 stops any subsequent output of the way enable signal WE upon receiving the control signal CS, needless reading out of tag data is suppressed.

More specifically, although the way #0 operates because the way enable signal WE[0] becomes "high", thereafter the way enable signals WE[1] to WE[3] do not become "high" and thus the ways #1 to way #3 do not operate. Hence, power consumption relating to cache access is suppressed.

In this connection, if the frame address of the tag portion that is read out from the way #0 does not match with the input frame address FA, the result is a missed access. Thus, the cache memory 16 next sets the way enable signal WE[1] that corresponds to way #1 to "high", and compares whether a frame address of a tag portion that is read out from way #1 matches the input frame address FA.

If the frame addresses match, the match signal c1 for the comparison result signal C becomes "high" to indicate a cache hit. If the frame addresses do not match, the comparison result is a missed access, and therefore the cache memory 16 next sets the way enable signal WE[2] that corresponds to way #2 to "high", and compares whether a frame address of a tag portion that is read out from way #2 matches the input frame address FA. Thereafter, the cache memory 16 checks whether there is a cache hit in way #3 in the same manner.

FIG. 6A to FIG. 6F are timing charts for a case in which there is a cache hit in the way #3. By outputting way enable signals WE[0] to [3] in sequential order, the selecting section 42 selects the way #0 to way #3 in sequential order in each division period, and determines a cache hit first in the way #3. In FIG. 6D, "1", "2", "4", and "8" that indicate "0001", "0010", "0100", and "1000", respectively, are output in sequential order.

In the comparison result signal C, the match signal c3 becomes "high" to indicate a cache hit. In FIG. 6E, "8" that indicates "1000" is output in the final division period on one CPU cycle as a cache hit [3] signal.

Accordingly, if a cache hit occurs at the timing of the way enable signals WE[1] or WE[2], the selecting section 42 does not output the way enable signal WE after the cache hit, and thereafter the way enable signal WE does not become "high" and power consumption relating to a cache access is suppressed.

As described above, the cache memory 16 attempts to execute tag comparisons for four ways in a predetermined order, in this case, the order is from way #0 to way #3, four times in one CPU cycle. However, once there is a cache hit during the process of executing the four tag comparisons, the way enable signal WE is not output thereafter. Hence, power consumption relating to way operations thereafter is suppressed.

Further, the above example is a case in which the operating frequency F of the CPU core 15 is 100 MHz, 4 is set as the number of divisions for priority 1, and the cache memory 16 operates in a sequential access mode that enables each way in sequential order.

However, in a case in which the operating frequency F of the CPU core 15 is set to 400 MHz, one CPU cycle can not be divided, and thus the cache memory 16 operates in a normal access mode in which the cache memory 16 outputs way enable signals WE[0] to WE[3] simultaneously to the four ways in one CPU cycle to simultaneously enable the four ways.

The cache memory 16 can also operate in an intermediate mode that is different to the sequential access mode and the normal access mode.

More specifically, in the case shown in FIG. 4, when the user sets the operating frequency F of the CPU core 15 to 100 MHz and specifies 2 as the number of divisions corresponding to priority 2, or when the user sets the operating frequency F of the CPU core 15 to 200 MHz and specifies 2 as the number of divisions corresponding to priority 1, the cache memory 16 operates in intermediate mode.

In such case, the selecting section 42 simultaneously outputs way enable signals WE[0] and [1] in the first half of one CPU cycle, and simultaneously outputs way enable signals WE[2] and [3] in the latter half of one CPU cycle.

FIG. 7 is a view for conceptually describing a power consumption state in the aforementioned three access modes, i.e. normal access mode, sequential access mode, and intermediate mode.

As shown in FIG. 7, in a normal access mode NM, since four ways are simultaneously enabled, there is no decrease in power consumption compared to the conventional technology.

The normal access mode NM is a case in which the number of divisions in the divisions table DT is 1. For the aforementioned example, three cases exist: a case in which the CPU core 15 operates at 100 MHz and the number of divisions 1 corresponding to priority 3 is specified, a case in which the CPU core 15 operates at 200 MHz and the number of divisions 1 corresponding to priority 2 is specified, and a case in which the CPU core 15 operates at 400 MHz and the number of divisions 1 corresponding to priority 1 is specified.

In a sequential access mode SM, as shown in FIG. 7, since the ways are enabled one by one in a predetermined order, the power consumption can be reduced in comparison with the normal access mode.

According to the present embodiment, since there are four ways, the sequential access mode SM represents a case in which the number of divisions in the divisions table DT is four. For the aforementioned example, this represents a case in which the CPU core 15 operates at 100 MHz and the number of divisions 4 corresponding to priority 1 is specified.

In the sequential access mode SM, as described above, because each way is being enabled in sequential order, there are cases in which there is a cache hit at a partway point during that process, and thus the power consumption can be reduced in comparison to the normal access mode. The case shown in the aforementioned FIG. 5A to FIG. 5F is a best case in which the power consumption reduction effect is large. In this case, a tag comparison is only performed one time, and the power consumption is reduced to a quarter of the amount of power consumption in the normal access mode.

The case shown in the aforementioned FIG. 6A to FIG. 6F is a worst case in which the power consumption reduction effect is not large. In this case, although a tag comparison is executed four times, since comparisons are executed four times in one CPU cycle, the access latency when viewed from the CPU core 15 operating at 100 MHz is not increasing.

Further, in the intermediate mode IM in FIG. 7, as shown in FIG. 7, if there is a cache hit in the first half of a cycle that is divided into two halves, the power consumption can be reduced by a half compared to the normal access mode.

According to the present embodiment, since there are four ways, the intermediate mode IM represents a case in which the number of divisions is 2 in the divisions table DT. For the above described example, this represents the following two cases: a case in which the CPU core 15 operates at 100 MHz and the number of divisions 2 corresponding to priority 2 is specified, and a case in which CPU core 15 operates at 200 MHz and the number of divisions 2 corresponding to priority 1 is specified.

In the case of the intermediate mode IM, because two ways at a time are being enabled in sequential order, there are cases in which there is a cache hit at a partway point during that process, and thus the power consumption can be reduced in comparison to the normal access mode NM. Further, in the case of the intermediate mode IM, although a tag comparison is executed two times, since comparisons are executed two times in one CPU cycle, the access latency when viewed from the CPU core 15 is not increasing.

As described above, according to the cache memory of the above described embodiment, the selecting section 42 outputs a plurality of way enable signals WE for a plurality of ways one at a time or in a plurality at a time in a predetermined order during one CPU cycle. When there is a cache hit during the process of outputting the plurality of way enable signals WE, output of the way enable signals WE stops. As a result, the cache memory operates with the lowest possible power consumption without increasing the access latency.

As described above, the cache memory device of the present embodiment can operate with the lowest possible power consumption while maintaining a cache hit performance that is equivalent to the cache hit performance in a normal access mode.

Second Embodiment

Next, a second embodiment of the present invention is described.
(Configuration)

According to the first embodiment, the cache memory 16 divided one CPU cycle into a set or specified number of divisions, and performed one or a plurality of tag comparisons within the divided periods. However, when performing tag comparisons in one CPU cycle that is divided into a specified number of divisions, since the cache memory operates at a high frequency, there is a risk of a timing violation occurring in the cache memory.

Therefore, according to the second embodiment a configuration is adopted that detects a state in which a timing violation is likely to occur before a timing violation actually occurs, and changes the number of divisions in a case in which a timing violation is likely to occur.

Figure 8:
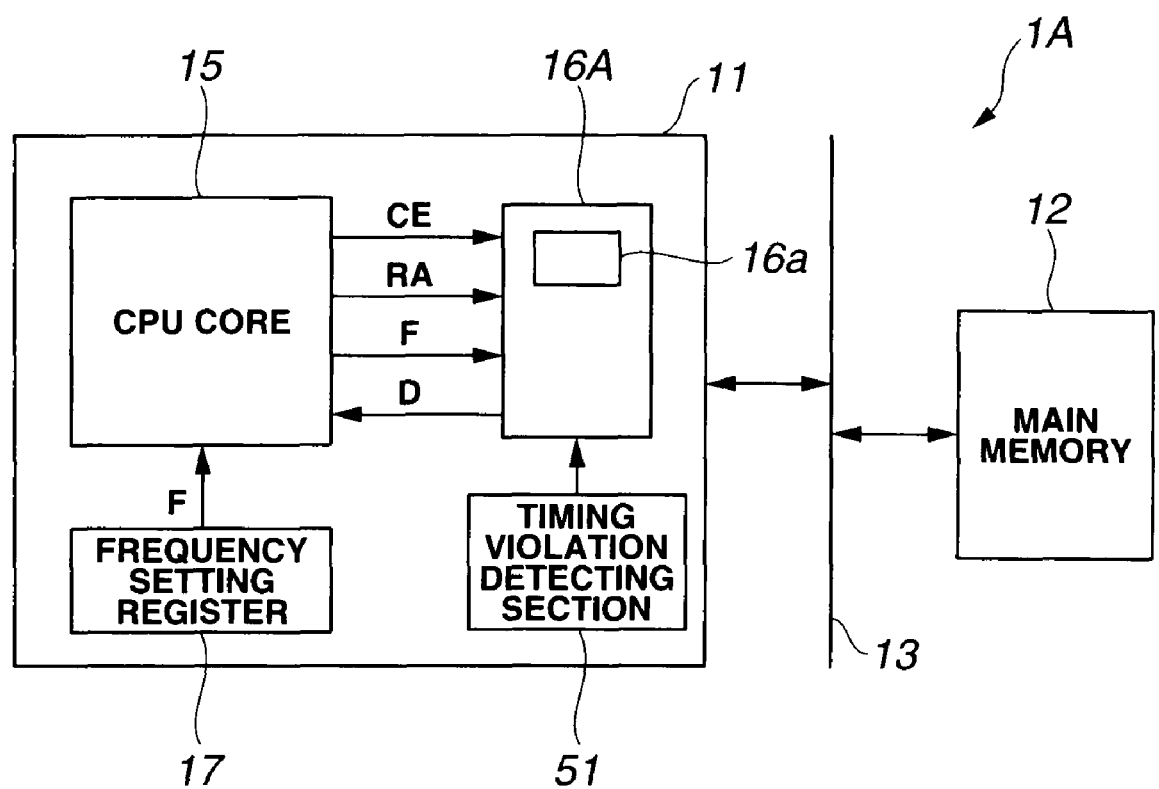
FIG. 8 is a configuration diagram that shows an example of the configuration of a processor according to a second embodiment of the present invention.

FIG. 8 is a configuration diagram that illustrates an example of the configuration of a processor IA according to the present embodiment. In FIG. 8, the same reference numerals are assigned to constituent elements that are the same as those in FIG. 1, and a description of those constituent elements is omitted. The difference between the processor 1A and the processor 1 shown in FIG. 1 is that the processor 1A has a timing violation detecting section 51. The configuration of the timing violation detecting section 51 will be described later.

Figure 9:
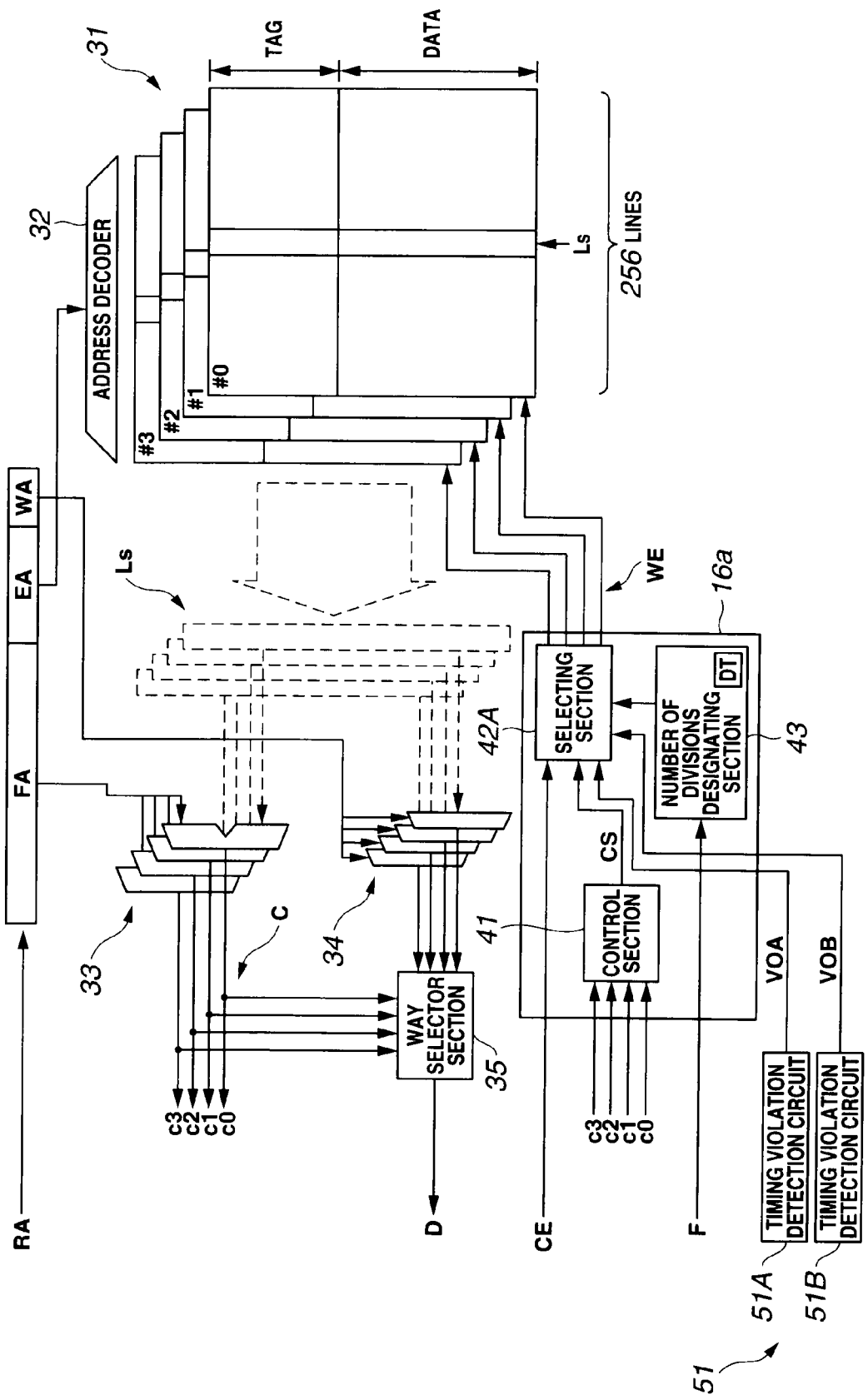
FIG. 9 is a view for explaining a configuration example of a cache memory according to the second embodiment of the present invention.

FIG. 9 is a view for describing a configuration example of a cache memory 16A according to the second embodiment. In FIG. 9, the same reference numerals are assigned to constituent elements that are the same as those in FIG. 3, and a description of those constituent elements is omitted.

As shown in FIG. 9, the timing violation detecting section 51 has two timing violation detection circuits 51A and 51B. The respective output signals VOA and VOB of the timing violation detection circuits 51A and 51B are input to the selecting section 42A. The timing violation detection circuits 51A and 51B are circuits for timing violation detection for 400 MHz and 200 MHz, respectively. More precisely, the timing violation detection circuits 51A and 51B are circuits that detect a state in which a timing violation is likely to occur for 400 MHz and 200 MHz, respectively. The timing violation detection circuits 51A and 51B are circuits that, in a critical path of the cache memory 16A, respectively output a logical value "0" ("low") in a case in which operating conditions are not severe, and output a logical value "1" ("high") in a state in which operating conditions are severe, more specifically, in a state in which a timing violation is likely to occur. The critical path is a logical path in which operations are slowest inside a chip of the CPU 11.

FIG. 10 is a block diagram that illustrates an example of the configuration of the timing violation detection circuit 51A. In this connection, since the configuration of the timing violation detection circuits 51A and 51B are the same, the timing violation detection circuit 51A is described hereunder using FIG. 10.

As shown in FIG. 10, the timing violation detection circuit 51A includes three flip-flops (hereunder, abbreviated to "FF") 61a, 61b and 61c, a plurality of inverter circuits 62a, a plurality of inverter circuits 62b, one inverter circuit 62c, and an exclusive OR (hereunder, abbreviated to "EXOR") circuit 63. The plurality of inverter circuits 62a constitutes a first delay section, and the plurality of inverter circuits 62b constitutes a second delay section.

Output of the FF 61a is input to the plurality of inverter circuits 62a that are connected in series. Output of the plurality of inverter circuits 62a is input to the plurality of inverter circuits 62b that are connected in series. Further, a plurality of inverter circuits that are included between the FF 61a and the FF 61b consist of an even number of inverter circuits.

A clock signal CLK of 400 MHz supplied to a critical path in the cache memory 16A is also supplied to the timing violation detection circuit 51A. Each of the FFs 61a to 61c operates at a rising edge of the clock signal CLK. In this connection, a configuration may also be adopted in which each of the FFs 61a to 61c operates at a falling edge of each clock signal CLK.

Further, a 200 MHz clock signal CLK supplied to a critical path in the cache memory 16A is also supplied to the timing violation detection circuit 51B.

A critical path is, for example, a data read-out path, and more specifically, a path from decoding of an entry address EA in the address decoder 32 until a selection of the way selector section 35. The plurality of inverter circuits 62a that is the first delay section delays an input signal by a delay amount T1 of the path thereof. Further, the plurality of inverter circuits 62b that is the second delay section further delays an input signal by a predetermined additional delay amount α.

The FF 61a takes in the output of the inverter circuit 62a at the first stage within the plurality of inverter circuits 62a at the timing of a rising edge of the clock signal CLK, and supplies an output signal to the first-stage inverter circuit 62a and the EXOR circuit 63. The first-stage inverter circuit 62a inverts the output from the FF 61a, and outputs the inverted output to the FF 61a and the inverter circuit 62a that is the next stage. More specifically, the FF 61a takes in a signal that is inverted by the first-stage inverter circuit 62a at the timing of a rising edge of a clock signal CLK.

A signal that is supplied to the first-stage inverter circuit 62a is propagated to the plurality of inverter circuits 62a and 62b that are an inverter chain, to be supplied to the FF 61b. More specifically, output of the FF 61a is delayed by the number of inverter circuit stages included between the FF 61a and FF 61b, and supplied to the FF 61b. The number of inverter circuits 62a and 62b is set so as to obtain a predetermined delay amount (T1+α) that corresponds to the delay amount of the first and second delay sections. In a case in which temperature conditions or the like change and the delay amount of the critical path changes, the delay amount produced by the plurality of inverter circuits 62a and 62b also changes in a similar manner.

The FF 61b takes in the output of the final-stage inverter circuit 62b at a rising edge of the clock signal CLK, and outputs the value to the EXOR circuit 63.

The EXOR circuit 63 performs an exclusive OR operation for values input from the FF 61a and the FF 61b, and outputs the result of the operation to the FF 61c.

The FF 61c takes in the input exclusive OR operation result at a rising edge of the clock signal CLK, and outputs the result to the inverter circuit 62c.

The inverter circuit 62c inverts the input from the FF 61c, and outputs the inverted input to the selecting section 42A as an output signal VOA.

In the critical path, since a timing violation occurs when an input signal is delayed by one cycle of the clock signal CLK (more specifically, the time of one clock) or more, the timing violation detection circuit 51 is configured so as to detect a state in which a timing violation is likely to occur, before a timing violation occurs.

The two outputs of the FFs 61a and 61b are input to the EXOR circuit 63. At the timing violation detection circuit 51 shown in FIG. 10, although the output of the EXOR circuit 63 is "high" while two inputs (i.e. two outputs of the FFs 61a and 61b) have a time difference that is within one cycle, when the time difference is greater than one cycle the output of the EXOR circuit 63 becomes "low".

In a state in which a delay amount in the first delay section corresponding to a circuit of the critical path increases due to a temperature change or the like, and before the delay amount thereof becomes greater than one cycle of the clock signal CLK, i.e. in a state in which a timing violation is likely to occur, the output signal VOA becomes "high". This is because a predetermined delay amount a is previously added to the delay amount T1 of the critical path, and an increase in that delay amount (T1+α) caused by a temperature change or the like to an amount greater than one cycle of the clock signal CLK is detected by the output of the EXOR circuit 63 changing.

In this connection, in some cases a timing violation arises due to a decrease in the power supply voltage of the CPU 11. For example, there are cases in which a timing violation occurs when the power supply voltage is controlled to below a voltage at a normal time, in addition to lowering the operating frequency of the CPU 11, in order to suppress power consumption by means of power saving control of the CPU 11 when a large arithmetic capability is not required.

The timing violation detection circuit 51B that has the same configuration as described above is provided as timing violation detection circuits that correspond to a case in which the operating frequency of the cache memory 16A is 200 MHz together with the timing violation detection circuit 51A.

The two timing violation detection circuits 51A and 51B are always operating on a chip of the CPU 11.

Further, when the selecting section 42A enables four ways in a predetermined order based on the chip enable signal CE and number of divisions data and the timing violation detection circuits 51A and 51B detect a state in which a timing violation is likely to occur, output of the way enable signals WE to the four ways is changed so as to change the number of divisions of one CPU cycle to a number of divisions that is less than the current number of divisions in operation.

(Operation)

Next, the operations of the cache memory according to the above described configuration are described. Hereunder, a description of constituent elements that are the same as in the first embodiment and that operate in the same manner as in the first embodiment is omitted, and operations that are different to those of the first embodiment are described.

When the two timing violation detection circuits 51A and 51B detect a state in which a timing violation is likely to occur, the timing violation detection circuits 51A and 51B output the output signals VOA and VOB that indicate that state to the cache access controller 16a of the cache memory 16A, respectively. The cache access controller 16a receives the output signals VOA and VOB of the two timing violation detection circuits 51A and 51B, and changes the aforementioned mode.

For example, a case is assumed in which the CPU core 15 operates at 100 MHz and the cache memory 16A operates at 400 MHz, and the cache memory 16A is operating in the sequential access mode SM that is shown in FIG. 7, with number of divisions 4 for the highest priority 1. The operations at that time are operations as shown in FIG. 5A to FIG. 5F and FIG. 6A to FIG. 6F. It is assumed that during operation in the sequential access mode SM, by power saving control that is not illustrated in the drawings, the power supply voltage of the CPU 11 decreases and the timing violation detection circuit 51A for 400 MHz detects a state in which a timing violation is likely to occur. At that time, the output signal VOA of the timing violation detection circuit 51A becomes "high", i.e. "1".

When the output signal VOA from the timing violation detection circuit 51A becomes "1", the selecting section 42A lowers the priority of the number of divisions. More specifically, as shown by the dotted line arrow A1 in FIG. 4, the selecting section 42A lowers the priority from 1 to 2 among the plurality of number of divisions that have been set in the divisions table DT, to change the number of divisions from the current number of divisions 4 to a lower number of divisions 2.

Upon the number of divisions becoming 2, the cache memory 16A operates in the intermediate mode IM shown in FIG. 7. More specifically, the cache memory 16A performs tag comparisons at 200 MHz. The operations at that time are operations as shown in FIG. 11A to FIG. 11F.

FIG. 11A to FIG. 11F are timing charts for describing operations of the processor 1A in a case in which the number of divisions is 2. Upon the timing violation detection circuit 51A detecting a state in which a timing violation is likely to occur and outputting the output signal VOA, the selecting section 42A outputs the way enable signals WE so as to perform tag comparisons with the cache memory 16A operating at 200 MHz.

As shown in FIG. 11D, the selecting section 42A outputs "3" in a first half of one CPU cycle as the way enable signal WE. More specifically, the selecting section 42A outputs "0011" to each of the ways #0 to #3. In the case shown in FIG. 11A to FIG. 11F, since a cache hit is not made in the first half of one CPU cycle, the selecting section 42A outputs "c", i.e. "1100" to each of the ways #0 to #3 in the latter half of one CPU cycle. In the case shown in FIG. 11E, since a hit is made in way #2 in the latter half, "4", i.e. "0100", is output as the comparison result signal C that indicates a cache hit.

As a result, a state in which a timing violation is likely to occur ceases.

However, it is also assumed that, thereafter, the timing violation detection circuit 51B for 200 MHz detects a state in which a timing violation is likely to occur due to a decrease in the power supply voltage of the CPU 11 or a temperature change or the like. At that time, the output signal VOB of the timing violation detection circuit 51B becomes "high", i.e. "1".

Since the output signal VOB of the timing violation detection circuit 51B has also become "1", the selecting section 42A decreases the priority of the number of divisions further. More specifically, as shown by the dotted line arrow A2 in FIG. 4, the selecting section 42A lowers the priority from 2 to 3 among the plurality of number of divisions that have been set in the divisions table DT, to change the number of divisions from the current number of divisions 2 to a lower number of divisions 1. Upon the number of divisions becoming 1, the cache memory 16A operates in the normal access mode NM shown in FIG. 7. More specifically, the cache memory 16A performs tag comparisons at 100 MHz.

As a result, a state in which a timing violation is likely to occur with respect to a tag comparison ceases.

The aforementioned timing violation detection circuit 51A is a timing violation detection circuit that corresponds to a case in which one CPU cycle is divided by four, i.e. a case in which the number of divisions is four, when the operating frequency of the CPU core 15 is 100 MHz. The timing violation detection circuit 51B is a timing violation detection circuit that corresponds to a case in which one CPU cycle is divided by two, i.e. a case in which the number of divisions is two, when the operating frequency of the CPU core 15 is 100 MHz. Hence, the timing violation detecting section 51 can have a plurality of timing violation detection circuits in accordance with the number of divisions.

The above example describes a case in which the CPU 11 is operating at 100 MHz. In a case in which the CPU 11 is operating at 200 MHz, when the timing violation detection circuit 51B for 200 MHz detects a state in which a timing violation is likely to occur, the selecting section 42A lowers the priority. More specifically, as shown by the dotted line arrow A3 in FIG. 4, the selecting section 42A changes the priority from 1 to 2 to change the number of divisions to 1. Upon the number of divisions changing to 1, the cache memory 16A that had been operating in the intermediate mode IM shown in FIG. 7, operates in the normal access mode NM shown in FIG. 7, i.e. performs tag comparisons at an operating frequency of 100 MHz.

As a result, a state in which a timing violation is likely to occur with respect to a tag comparison ceases.

In this connection, thereafter, when a state in which a timing violation at 200 MHz is likely to occur ceases, since the output signal VOB of the timing violation detection circuit 51B becomes "0", the selecting section 42A raises the priority. Furthermore, thereafter, when a state in which a timing violation at 400 MHz is likely to occur ceases, since the output signal VOA of the timing violation detection circuit 51A becomes "0", the selecting section 42A raises the priority.

As described in the foregoing, the cache memory 16A of the present embodiment can operate with the lowest possible power consumption while maintaining a cache hit performance that is equivalent to the cache hit performance of the normal access mode. Further, according to the cache memory 16A, even in a case in which there is a decrease in the power supply voltage caused by power saving control of the CPU 11 or the like, when a state is entered in which a timing violation is likely to occur, the operation mode for the cache memory 16A changes prior to occurrence of the timing violation. As a result, it is possible to prevent occurrence of a timing violation and also to provide a margin for a reduction in the power supply voltage that is executed by power saving control of the CPU 11.

The present invention is not limited to the above described embodiments, and various modifications and improvements are possible within a range that does not depart from the spirit and scope of the present invention.

What is claimed is:

1. A cache memory control circuit, comprising:
a selecting section configured to select, in a predetermined order, each way or a predetermined two or more ways of a cache memory having a plurality of ways, the selecting section being configured to divide one CPU cycle with a number of divisions that is set in accordance with an operating frequency of a CPU that is connected to the cache memory and, within each period into which the CPU cycle is divided, to select each way or the predetermined two or more ways;
a cache hit detecting section configured to detect a cache hit in each way selected by the selecting section; and
a control section configured to, upon detection of the cache hit by the cache hit detecting section, stop a selection of the respective ways or the predetermined two or more ways at the selecting section.

2. The cache memory control circuit according to claim 1, further comprising:
   a divisions table in which the number of divisions for an operating frequency of the CPU is set;
   wherein the selecting section divides the one CPU cycle with the number of divisions that is set in the divisions table.

3. The cache memory control circuit according to claim 2, wherein the number of divisions corresponding to each of a plurality of operating frequencies of the CPU is set in the divisions table.

4. The cache memory control circuit according to claim 3, further comprising:
   a number of divisions designating section configured to refer to the divisions table and designate the number of divisions corresponding to a CPU operating frequency that is set;
   wherein the plurality of number of divisions for each operating frequency of the CPU is set in the divisions table, and
   the selecting section divides the one CPU cycle with a number of divisions that is designated by the number of divisions designating section.

5. The cache memory control circuit according to claim 4, wherein:
   the plurality of number of divisions that are set in the divisions table are set together with a priority, and
   the number of divisions designating section determines and designates in order of higher priority a number of divisions that is designated.

6. The cache memory control circuit according to claim 4, wherein, upon entering a state in which a timing violation is likely to occur, the one CPU cycle is divided with a number of divisions that is less than a current number of divisions, that is selected from among the plurality of number of divisions that are set in the divisions table.

7. The cache memory control circuit according to claim 6, further comprising:
   a timing violation detecting section configured to detect a state in which the timing violation is likely to occur.

8. The cache memory control circuit according to claim 7, wherein the timing violation detecting section includes a plurality of timing violation detection circuits that are in accordance with the number of divisions.

9. A processor, comprising:
   a cache memory control circuit that includes:
   a selecting section configured to select, in a predetermined order, each way or a predetermined two or more ways of a cache memory having a plurality of ways, the selecting section being configured to divide one CPU cycle with a number of divisions that is set in accordance with an operating frequency of a CPU that is connected to the cache memory and, within each period into which the CPU cycle is divided, to select each way or the predetermined two or more ways,
   a cache hit detecting section configured to detect a cache hit in each way selected by the selecting section, and
   a control section configured to, upon detection of the cache hit by the cache hit detecting section, stop a selection of the respective ways or the predetermined two or more ways at the selecting section;
   a CPU that is connected to the cache memory; and
   an operating frequency setting section configured to set an operating frequency of the CPU.

10. The processor according to claim 9, further comprising:
    a divisions table in which the number of divisions for an operating frequency of the CPU is set;
    wherein the selecting section divides the one CPU cycle with the number of divisions that is set in the divisions table.

11. The processor according to claim 10, wherein the number of divisions corresponding to each of a plurality of operating frequencies of the CPU is set in the divisions table.

12. The processor according to claim 11, further comprising:
    a number of divisions designating section configured to refer to the divisions table and designate the number of divisions corresponding to a CPU operating frequency that is set;
    wherein the plurality of number of divisions for each operating frequency of the CPU is set in the divisions table, and
    the selecting section divides the one CPU cycle with a number of divisions that is designated by the number of divisions designating section.

13. The processor according to claim 12, wherein:
    the plurality of number of divisions that are set in the divisions table are set together with a priority, and
    the number of divisions designating section determines and designates in order of higher priority a number of divisions that is designated.

14. The processor according to claim 12, wherein, upon entering a state in which a timing violation is likely to occur, the one CPU cycle is divided with a number of divisions that is less than a current number of divisions, that is selected from among the plurality of number of divisions that are set in the divisions table.

15. The processor according to claim 14, further comprising:
    a timing violation detecting section configured to detect a state in which the timing violation is likely to occur.

16. The processor according to claim 15, wherein the timing violation detecting section includes a plurality of timing violation detection circuits that are in accordance with the number of divisions.

17. A cache memory control circuit, comprising:
    a selecting section having a first mode that simultaneously selects all ways of a cache memory having a plurality of ways, and a second mode that, in a predetermined order, selects each way or a predetermined two or more ways, the selecting section being configured to divide one CPU cycle with a number of divisions that is set in accordance with an operating frequency of a CPU that is connected to the cache memory and, within each period into which the CPU cycle is divided, to select each way or the predetermined two or more ways;
    a cache hit detecting section configured to detect a cache hit in each way selected by the selecting section; and
    a control section configured to stop a selection of the respective ways or the predetermined two or more ways at the selecting section upon detecting the cache hit by the cache hit detecting section when the selecting section is in the second mode.

* * * * *